(12) United States Patent
Arslan et al.

(10) Patent No.: US 7,212,594 B2
(45) Date of Patent: May 1, 2007

(54) METHODS AND APPARATUS FOR CANCELING CO-CHANNEL INTERFERENCE IN A RECEIVING SYSTEM USING SPATIO-TEMPORAL WHITENING

(75) Inventors: Huseyin Arslan, Morrisville, NC (US); Ali S. Khayrallah, Apex, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 0 days.

(21) Appl. No.: 11/270,037

(22) Filed: Nov. 9, 2005

(65) Prior Publication Data

US 2006/0056549 A1  Mar. 16, 2006

Related U.S. Application Data

(63) Continuation of application No. 09/956,443, filed on Sep. 19, 2001, now Pat. No. 7,031,411.

(51) Int. Cl.
  *H03D 1/04* (2006.01)
(52) U.S. Cl. .......................... 375/346; 375/350
(58) Field of Classification Search ................ 375/260, 375/262, 267, 285, 325–326, 341, 362, 346–350; 370/337, 347, 350; 455/132–135, 137, 272, 455/277.1, 278.1, 63.1, 296, 307
See application file for complete search history.

(56) References Cited

U.S. PATENT DOCUMENTS

| 5,031,195 A | * | 7/1991 | Chevillat et al. | ........... 375/234 |
| 5,231,648 A | | 7/1993 | Driedger et al. | |
| 5,828,658 A | * | 10/1998 | Ottersten et al. | ........... 370/310 |
| 6,091,361 A | * | 7/2000 | Davis et al. | ................ 342/378 |
| 6,144,711 A | * | 11/2000 | Raleigh et al. | ............. 375/347 |
| 2004/0014424 A1 | * | 1/2004 | Kristensson et al. | ....... 455/63.1 |

FOREIGN PATENT DOCUMENTS

| WO | WO 99 65160 | 12/1999 |
| WO | WO 00 64061 | 10/2000 |
| WO | WO 00/64061 A1 | 10/2000 |

OTHER PUBLICATIONS

Asztely, D. et al., "MLSE and Spatio-Temporal Interference Rejection Combining with Antenna Arrays," *Proceedings of Eusipco-98*, 1998.
Molnar, Karl J., et al., "Adaptive Array Processing MLSE Receivers for TDMA Digital Cellular/PCS Communications," *IEEE Journal on Selected Areas in Communications*, vol. 19, No. 8, Oct. 1998.

* cited by examiner

*Primary Examiner*—Khanh Tran
(74) *Attorney, Agent, or Firm*—Moore & Van Allen PLLC; Steven B. Phillips

(57) ABSTRACT

Methods and apparatus for canceling co-channel interference in a receiving system using spatio-temporal whitening. In some embodiments, a spatio-temporal interference canceling method, and apparatus for carrying out the method are provided which effectively cancel co-channel interference despite frequency offset between the desired signal and the interferer in a TDMA type system. Real and imaginary component values of the total received signal are used for virtual diversity branches, and a vector-valued auto regressive model is used to characterize the interference. In other embodiments, spatio-temporal interference whitening is used to improve timing estimates used for synchronization. The two uses of spatio-temporal whitening can be combined in one receiver. The invention is typically implemented in one or more programmed digital signal processors or application specific integrated circuits (ASICS), embodied in a receiving system.

10 Claims, 15 Drawing Sheets

METHODS AND APPARATUS FOR CANCELING CO-CHANNEL INTERFERENCE IN A RECEIVING SYSTEM USING SPATIO-TEMPORAL WHITENING

CROSS REFERENCE TO RELATED APPLICATION

This application is a continuation of and claims priority from, commonly assigned application Ser. No. 09/956,443 filed Sep. 19, 2001 now U.S. Pat. No. 7,031,411, the entire disclosure of which is incorporated herein by reference.

BACKGROUND OF THE INVENTION

A receiver that needs to demodulate a desired signal in a communication system must always deal with extracting the desired signal from noise. At one time, so-called "white noise" presented the greatest concern. White noise is characterized in that the noise "signal" is random, or uncorrelated, in time and space, meaning that the amplitude, phase, and other measurable characteristics of the noise at any one time or place cannot be used to predict the characteristics at any other time and place. Methods of designing a receiver to deal with white noise are wellknown and have been in existence for decades.

Modern communication systems, such as wireless time domain multiplexed access (TDMA) systems increasingly have to deal with so-called "colored noise" which is correlated and has predictable characteristics. Co-channel interference is one example of colored noise. Co-channel interference has become a significant problem as the population density of people using wireless, cellular communication devices increases. Because of the traffic demand, it is necessary to re-use channels more frequently on a geographic basis. Co-channel interference can cause problems in different sections of a TDMA receiver. Such interference can cause difficulty with the timing estimation used for synchronization in the initial stage of processing a received signal. It can also create errors filtering and demodulating the signal in subsequent stages.

FIG. 1 illustrates the received signal at wireless terminal 101 where there is both co-channel interference and white noise present. Base station 102 is transmitting a desired signal over a channel designated $C_d$ and base station 103 is transmitting an interfering signal or "interferer" over a channel designated $C_i$. Other interference is simply referred to as "noise" n. Given that each channel has specific characteristics that are represented with complex valued quantities, the total received signal at wireless terminal 101 can be represented as:

$$r = C_d(x) \ S_d + C_i(x) \ S_i + n,$$

where $S_d$ is the desired signal and $S_i$ is the interferer. Note that r is even where the signals, $S_d$ and $S_i$ are real-valued. FIG. 2 illustrates the spectrums of the desired signal and the interferer, 201 and 202 respectively, in the frequency domain.

One known way to deal with co-channel and other colored interference in communication systems is to use some type of whitening filter to "whiten" the interference, so that the desired signal now only needs to be distinguished from white noise. Temporal whitening involves removing temporal correlation from the interfering signal and requires knowledge of the interfering signal's characteristics at different points in time. Spatial whitening involves removing spatial correlation from the interfering signal and requires knowledge of the interfering signal's characteristics at different points in space. True, spatial whitening in wireless systems requires multiple antennas. A signal is said to have a different "diversity branch" for each antenna. The two types of whitening can be combined, resulting in whitening in both time and space, commonly called "spatio-temporal" whitening. With any kind of whitening, knowledge of the characteristics of the channel is also needed to extract and demodulate the desired signal from the whitened signal.

In TDMA systems, such as those that implement the well-known Global System for Mobile (GSM), General Packet Radio Service (GPRS), and Enhanced General Packet Radio Service (EGPRS) standards and their various incarnations, a signal is received as a stream of timeslots. Each timeslot contains a known training sequence, also called a "sync word." FIG. 3 illustrates such a timeslot, with training sequence, 301. Since the contents of the training sequence is known, the characteristics of the desired and interfering signals can be isolated in time and space, and used for spatio-temporal whitening just prior to demodulating the desired signal, using multiple antennas to perform the spatio-temporal whitening. Co-channel interference is also a problem for mobile terminals. However, since only one antenna is available, spatial or spatio-temporal whitening is difficult. Additionally, spatio-temporal whitening just prior to demodulating does not increase synchronization accuracy in the presence of co-channel interference.

BRIEF SUMMARY OF THE INVENTION

In some embodiments of the invention, interference in a received signal is cancelled prior to demodulation by determining spatio-temporal, time-varying whitening filter parameters and time-varying channel parameters based on a frequency offset between an interferer and a desired signal. One way to determine the time-varying parameters is to determine fixed parameters first and then rotate them using the frequency offset. The filter parameters are applied to the received signal to obtain a whitened signal. The whitened signal is then demodulated using the time-varying channel parameters. Co-channel interference is effectively canceled despite any frequency offset between the interferer and the desired signal. Prefiltering is provided using the time-varying channel parameters if needed. Time-varying whitening filter and channel parameters can also be determined by sampling portions of timeslots in the received signal and updating the parameters for each selected portion. In this case, co-channel interference is effectively canceled despite any frequency offset or slot misalignment between the interferer and the desired signal.

In another embodiment, the entire received signal is de-rotated using the frequency offset between the desired signal and the interferer. Time-invariant whitening filter parameters and initial channel parameters are determined, in TDMA systems, using the training sequence of the timeslot of interest. The time-invariant whitening filter parameters are used to whiten the received signal over the timeslot prior to demodulation to produce the whitened signal. Time-varying channel parameters for demodulation and prefiltering are obtained by rotating the initial channel parameters with the frequency offset.

In other embodiments, synchronization is improved by including spatio-temporal whitening in the timing estimation process in the interference whitening synchronization block or synchronization and initial channel estimation block of a receiver. In this case a plurality of signal samples is produced for a portion of the received signal, typically, the training sequence. They may be produced either by decimating to reduce the number of samples per symbol, or they may be produced by first applying a timing estimation method without spatio-temporal whitening. In any case, spatio-temporal interference whitening is applied to each of the plurality of signal samples to produce a plurality of whitened signal samples. The best sample is determined from the whitened signal samples based on channel estimates and on a relative, minimum value of a specified metric. The receiver is synchronized based on this best sample. The synchronization with spatio-temporal whitening may be applied to all signals receiver, or it may be selectively applied only when needed, depending on the channel-to-noise ratio achieved with a more traditional, less computationally intensive method.

Apparatus to carry out the invention is typically implemented in one or more programmed digital signal processors or application specific integrated circuits (ASICS). The apparatus that carries out the invention may include synchronization logic using spatio temporal interference whitening (STIW). The synchronization logic may include a decimator and a selection system to determine the best sample to use for synchronization from a plurality of samples. The apparatus also may include a single antenna interference rejection (SAIR) block that determines the channel parameters and filter parameters. These blocks may be combined. In one embodiment, the SAIR block applies the whitening filter to the received signal based on a frequency offset between the desired signal and an interferer. Demodulation logic demodulates the whitened signal using the channel parameters. The demodulation logic in some embodiments includes either decision feedback sequence estimation (DFSE) or maximum likelihood sequence estimation (MLSE). Prefiltering may also be provided.

The invention can be embodied in any receiving system, including, but not limited to: a wireless terminal having a single antenna; a base station with a single antenna; or processing circuitry that deals with the signal at a single antenna in a larger system using multiple antennas, whether a base station, mobile terminal or other receiving system. In the case of a TDMA based mobile terminal, the invention can be embodied in baseband logic that is operatively connected to a radio block and a main processor system.

DETAILED DESCRIPTION OF THE INVENTION

The present invention is typically embodied in a receiving system for a communication network employing time domain multiplexed access (TDMA). The embodiments disclosed are not restricted to any particular standard, however. As previously mentioned, the well-known Global System for Mobile (GSM) communication system is one example of a TDMA system which might employ the invention. The timeslot illustrations shown herein are based on GSM. However, differences in these timeslot arrangements, such as including the training sequence in some other part of the timeslot, will not affect the operation of the invention.

It should also be understood that not every feature of the receiving system described is necessary to implement the invention as claimed in any particular one of the appended claims. Various elements of receivers are described to fully enable the invention. It should also be understood that throughout this disclosure, where a process or method is shown or described, the steps of the method may be performed in any order or simultaneously, unless it is clear from the context that one step depends on another being performed first.

Some of the block diagrams and flowcharts, which are used to illustrate the inventive concepts, are not mutually exclusive. Rather, each one has been tailored to illustrate a specific concept discussed. In some cases, the elements or steps shown in a particular drawing co-exist with others shown in a different drawing, but only certain elements or steps are shown for clarity. For example, the synchronization methods using spatio-temporal whitening can be used independently in the same receiving system with another independent single-antenna interference whitening (SAIR) block just prior to demodulation and/or prefiltering.

Figure 1:
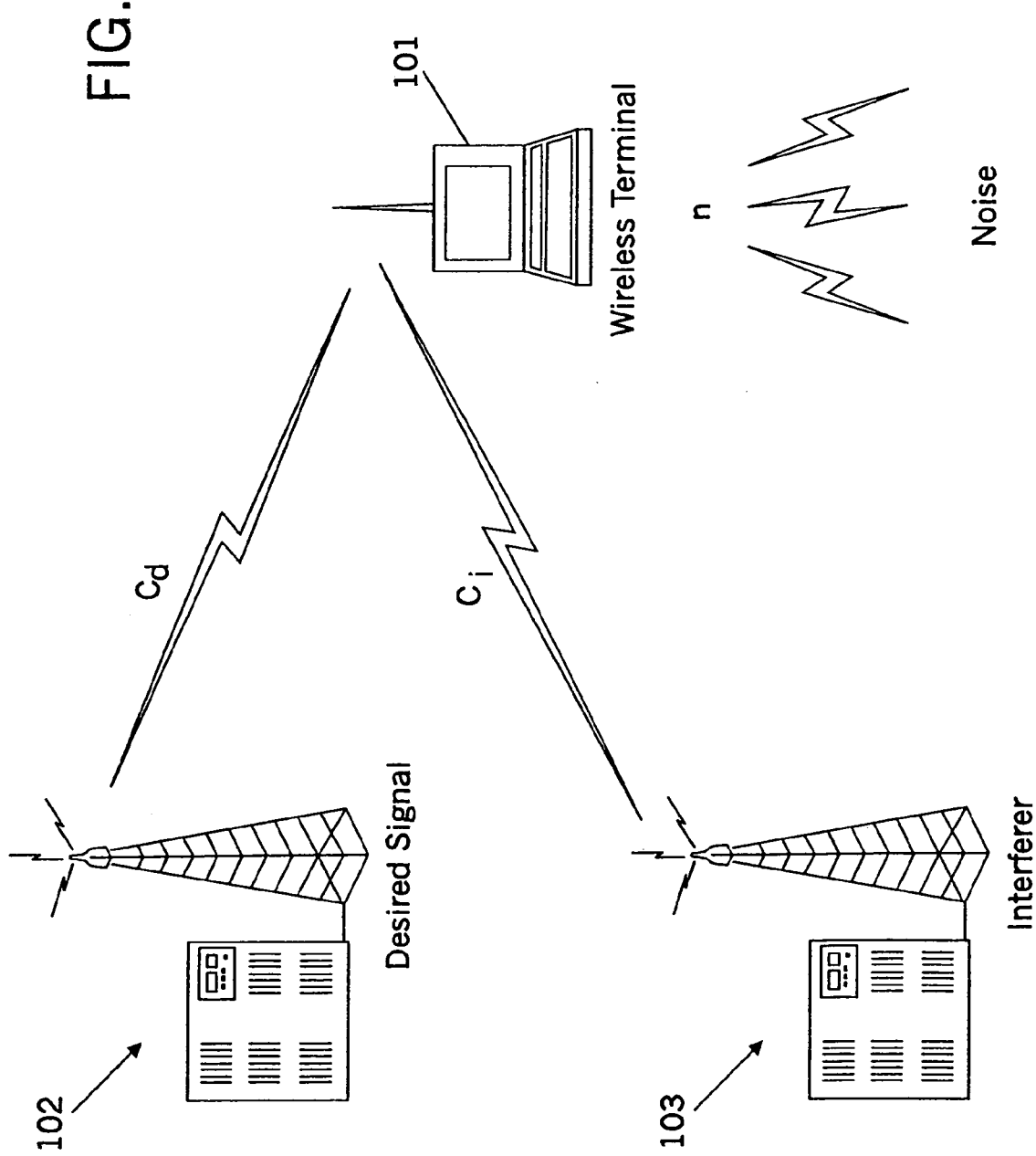
FIG. 1 is a network block diagram that illustrates an operating environment in which co-channel interference is present.
Figure 2:
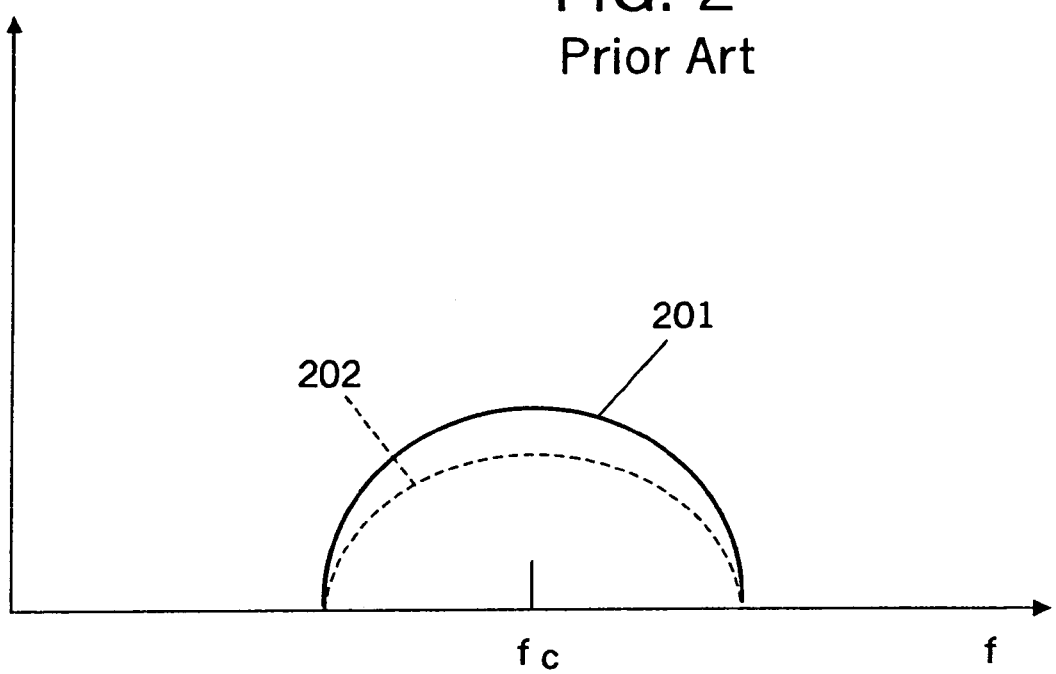
FIG. 2 is a frequency domain graph illustrating co-channel interference.
Figure 3:
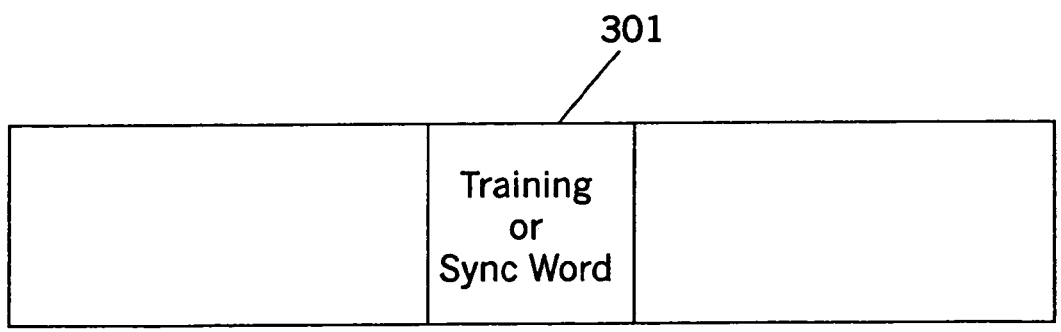
FIG. 3 illustrates a known TDMA timeslot having a training sequence, otherwise known as a sync word.
Figure 4:
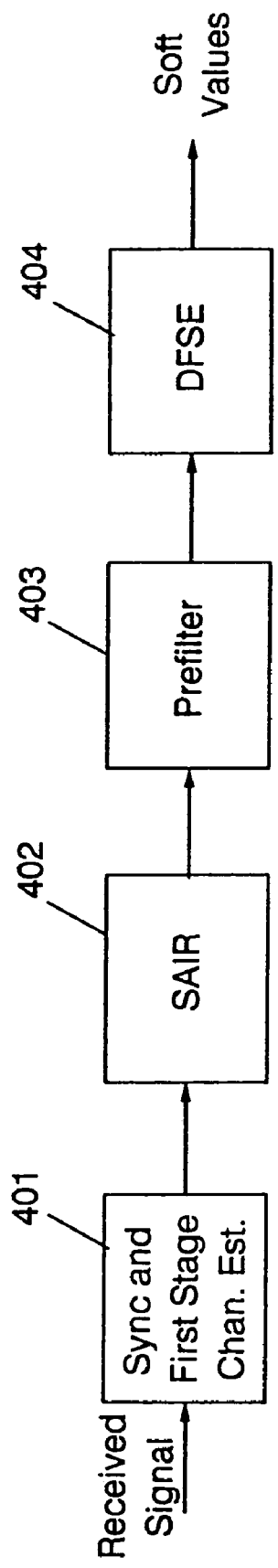
FIG. 4 is a high-level block diagram of a receiving system according to some embodiments of the invention.
Figure 5:
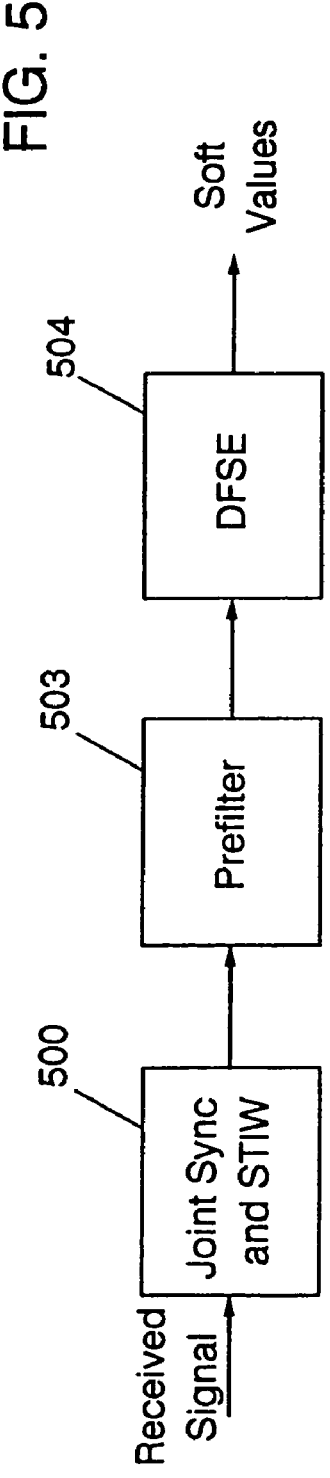
FIG. 5 is another high-level block diagram of a receiving system according to other embodiments of the invention.

The invention includes the application of improved uses of spatio-temporal whitening in at least two places in a TDMA type receiving system. FIGS. 4 and 5 present high-level block diagrams illustrating these uses. FIG. 4 illustrates a receiving system including a first stage, 401, which is a synchronization and channel estimation logic block according to the prior art. SAIR 402 is a single-antenna interference rejection block, according to the invention, which offers improved performance in the presence of co-channel interferer which exhibits a frequency offset as compared to the desired signal. The system of FIG. 4 also includes a prefilter 403 and a decision feedback sequence estimation (DFSE) block, 404. The DFSE performs demodulation using estimated channel parameters. These elements receive a received signal and produce soft values for the received symbols to be further processed by parts of the receiving system which are known to those of ordinary skill in the art and which are omitted for clarity.

FIG. 5 illustrates embodiments where spatio-temporal whitening is included in the synchronization and channel estimation logic according to the invention. Joint synchronization and spatio-temporal interference whitening (STIW) block 500 is also referred to herein as an "interference whitening synchronization block" to distinguish it from the synchronization and channel estimation logic of the prior art shown in FIG. 4. Prefilter 503 and DFSE block 504 are essentially the same as shown in FIG. 4. It should be noted that the interference whitening synchronization block, or joint synchronization and STIW block, 500, as shown in FIG. 5 can make use of any kind of spatio-temporal interference whitening (STIW) filter. The SAIR discussed throughout this disclosure is one particular type of STIW. The interference whitening synchronization block of the invention can use SAIR, and in effect, combine the functions of the SAIR block in FIG. 4 with the functions of the joint synchronization and STIW block of FIG. 5. It is also possible to have two SAIR functions, one in block 500 of FIG. 5, and a separate one placed as shown in FIG. 4. However for synchronization with interference whitening according to the invention, any kind of STIW will do.

A brief overview of the concept of separating a signal into virtual diversity branches based on real and imaginary parts follows. The Single Antenna Interference Rejection (SAIR) algorithm is an algorithm that enables interference rejection with only one antenna. The algorithm concentrates on real-valued modulation schemes, such as binary phase shift keying (BPSK) and Gaussian minimum shift keying (GMSK). Such an algorithm can be implemented as an equalizer based on maximum likelihood sequence estimation (MLSE), or on decision feedback sequence estimation (DFSE). The main difference between MLSE and DFSE is that DFSE requires a prefilter which must be taken into account in the whitening filter matrix. The real and imaginary parts of the signal are referred to as the I and Q channels, respectively. Additionally, a SAIR algorithm models the noise and interference as a vector-valued auto regressive (VAR) process in order to design a finite impulse response (FIR) matrix whitening filter.

A better model of the complex signal r previously discussed is represented by the equation:

$$\tilde{r}(n) = \sum_{m=0}^{L} \tilde{h}(m)s(n-m) + \tilde{v}(n),$$

where $\tilde{h}(m)$ is the complex-valued channel impulse response of length $L+1$, $s(n)$ is sent symbols and $\tilde{v}(n)$ denotes the additive noise and interference. Splitting the above equation into real and imaginary parts to separate the I and Q channels yields:

$$r(n) = \begin{bmatrix} r_I(n) \\ r_Q(n) \end{bmatrix} = \sum_{m=0}^{L} \begin{bmatrix} h_I(m) \\ h_Q(m) \end{bmatrix} s(n-m) + v(n).$$

Note that since $s(n)$ is real-valued, it can be estimated from both the real and imaginary parts of the received signal.

The noise and interference is modeled as a VAR process by the following equation:

$$v(n) = \begin{bmatrix} v_I(n) \\ v_Q(n) \end{bmatrix} = \sum_{k=1}^{K} A_k \begin{bmatrix} v_I(n-k) \\ v_Q(n-k) \end{bmatrix} + e(n),$$

where $A_k$ is the matrix of VAR coefficients, $$A_k = \begin{bmatrix} a_{11}(k) & a_{12}(k) \\ a_{21}(k) & a_{22}(k) \end{bmatrix}, \quad 1 \le k \le K,$$

and where the noise vector, $$e(n) = \begin{bmatrix} e_I(n) \\ e_Q(n) \end{bmatrix},$$

is assumed to be white and Gaussian.

Given the above, a matrix FIR whitening filter with coefficients $W_k$ can be designed as:

$$W_k = \begin{cases} A_k & \text{for } k \ge 1 \\ I & \text{for } k = 0. \end{cases}$$

The whitened signal then becomes:

$$r_w(n) = \sum_{k=0}^{K} W_k \sum_{m=0}^{L} \left[\begin{array}{c} h_I(m) \\ h_Q(m) \end{array}\right] s(n-m-k) + \sum_{k=0}^{K} W_k v(n-k).$$

Applying the VAR equation yields:

$$r_w(n) = \sum_{i=0}^{L+K} \left[\begin{array}{c} b_I(i) \\ b_Q(i) \end{array}\right] s(n-i) + e(n),$$

where b(i) denotes the channel after whitening. The noise is now temporally white and uncorrelated.

In order to obtain uncorrelated elements of the noise e(n), I/Q noise decorrelation is performed according to:

$$\bar{r}_w(n) = D r_w(n),$$

where D is a matrix with the property, $$Q^{-1} = D^T D.$$

The matrix D is calculated using a Cholesky factorization scheme, ultimately resulting in:

$$\bar{r}_w(n) = \sum_{i=0}^{K+L} \left[\begin{array}{c} \bar{b}_I(i) \\ \bar{b}_Q(i) \end{array}\right] s(n-i) + \bar{e}(n),$$

where $\bar{e}(n)$ is a white zero mean noise vector with mutually uncorrelated elements and where $\bar{b}(i)$ is the channel impulse response after whitening and I/Q noise decorrelation. In practical application, the VAR matrix $A_k$, the covariance matrix Q, and b(i) can be estimated using an indirect, generalized least squares method.

In the above discussion, it is assumed that the interferer does not have any frequency offset or timeslot misalignment as compared to the desired signal. In this case, the whitening filter parameters are obtained over the synch word of a timeslot and applied to the received signal for the whole timeslot. If there is frequency offset in the interfering signal, the optimal whitening filter parameters will change over time, as the interfering signal will be rotated depending on the amount of the frequency error. Therefore, if the parameters that are obtained for the whitening filter over the synch word as shown above are applied to the whole received signal, the frequency offset may reduce some of the performance gain that could otherwise be obtained. Slot misalignment between the interfering signal's timeslots and the desired signal's timeslot can have a similar effect.

There are several ways the SAIR can be improved to take into account the frequency offset of a co-channel, interfering signal. If the frequency offset of the interferer is known, time-varying whitening filter parameters including the matrix coefficients can be obtained. Time-varying channel parameters can also be obtained. These time-varying parameters can be obtained directly. Alternatively, the initial whitening filter coefficients and channel coefficients can be obtained as described above, discounting frequency offset, and then the coefficients can be updated by rotating them using the knowledge of the frequency offset. Coefficients are updated in each direction from the sync word as follows:

$$a'_{11}(n) = a_{11}\cos^2(2\pi f_0 n) + a_{22}\sin^2(2\pi f_0 n) - (a_{12}+a_{21})\cos(2\pi f_0 n)\sin(2\pi f_0 n)$$

$$a'_{12}(n) = a_{12}\cos^2(2\pi f_0 n) + d_{21}\sin^2(2\pi f_0 n) - (a_{11}+a_{12})\cos(2\pi f_0 n)\sin(2\pi f_0 n)$$

$$a'_{21}(n) = a_{21}\cos^2(2\pi f_0 n) + d_{12}\sin^2(2\pi f_0 n) - (a_{11}+a_{22})\cos(2\pi f_0 n)\sin(2\pi f_0 n)$$

$$a'_{22}(n) = a_{22}\cos^2(2\pi f_0 n) + a_{11}\sin^2(2\pi f_0 n) - (a_{12}+a_{21})\cos(2\pi f_0 n)\sin(2\pi f_0 n)$$

where $a_{ij}$ is the (ixj)th element of the whitening filter parameter matrix A.

The original channel parameters that were obtained only over the sync word can be updated as:

$$b(n) = [\Gamma \cdot \Psi(n)] \cdot D'(n),$$

where, for a second order VAR process, $$\Gamma = \begin{bmatrix} h_1^T & 0 & 0 \\ h_1^T & h_2^T & 0 \\ h_1^T & h_2^T & h_3^T \\ \vdots & \vdots & \vdots \\ h_{L-2}^T & h_{L-1}^T & h_L^T \\ 0 & h_{L-1}^T & h_L^T \\ 0 & 0 & h_L^T \end{bmatrix} \Psi(n) = \begin{bmatrix} A'_0(n) \\ A'_1(n) \\ A'_2(n) \end{bmatrix}.$$

The prefilter coefficients are calculated based on the initial channel estimates over the sync word and can be fixed over the whole timeslot. Note that the whitening filter parameters do not change considerably for each consecutive sample for more reasonable amounts of frequency offset (in the range of 200–500 Hz). Therefore, updating the parameters might not be necessary at each sampling point in every situation. It may be sufficient to divide the timeslot into segments and update the parameters on a segment-by-segment basis, thus reducing the computational complexity. How often such an update is needed depends on the amount of the frequency offset.

Figure 6:
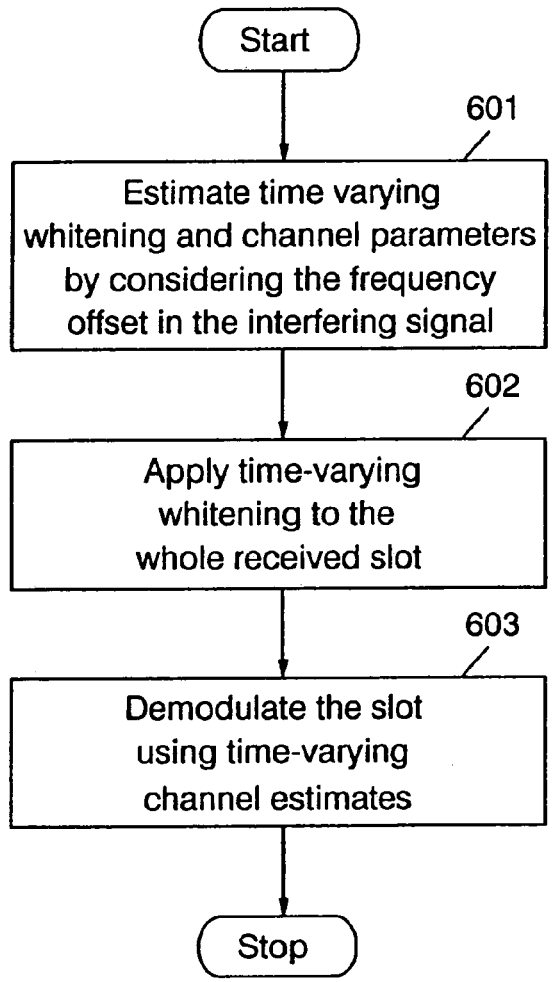
FIG. 6 is a flowchart illustrating the interference rejection method according to one embodiment of the invention.

FIG. 6 is a high-level flowchart of these embodiments of the invention. At step 601, time-varying whitening and channel parameters are estimated, typically based on the training sequence, taking into account a known-frequency offset. At step 602, the time varying whitening filter parameters are applied to the whole time-slot. At step 603, the timeslot is demodulated using the time varying channel parameters.

Figure 7:
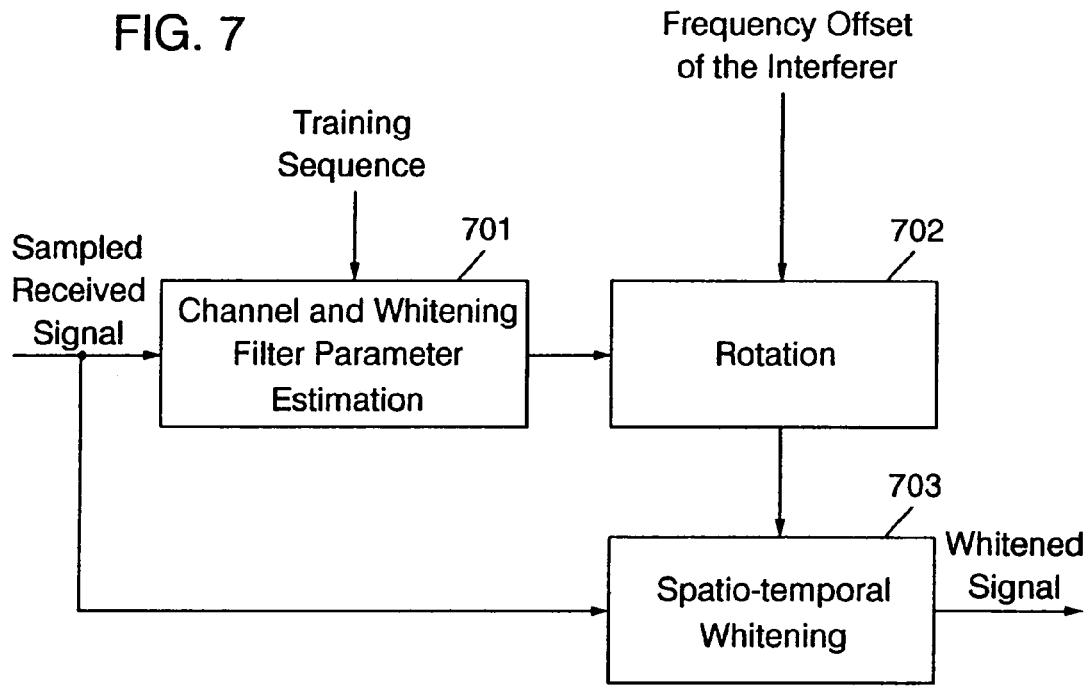
FIG. 7 is a block diagram of a single-antenna interference rejection (SAIR) block used in a receiving system according to an embodiment of the invention.

FIG. 7 is a block diagram of the SAIR block according to the present embodiment. Initial channel and whitening filter parameters are estimated at 701 based on the training sequence in a sampled, received signal. These parameters are then rotated by rotation block 702 using the frequency offset of the interferer. Spatio-temporal whitening using the time-varying parameters resulting from the rotation is applied by the whitening filter, 703, and a whitened signal is produced. Time-varying channel parameters are also produced and passed along to the pre-filter and demodulation logic of the receiver system.

Figure 8:
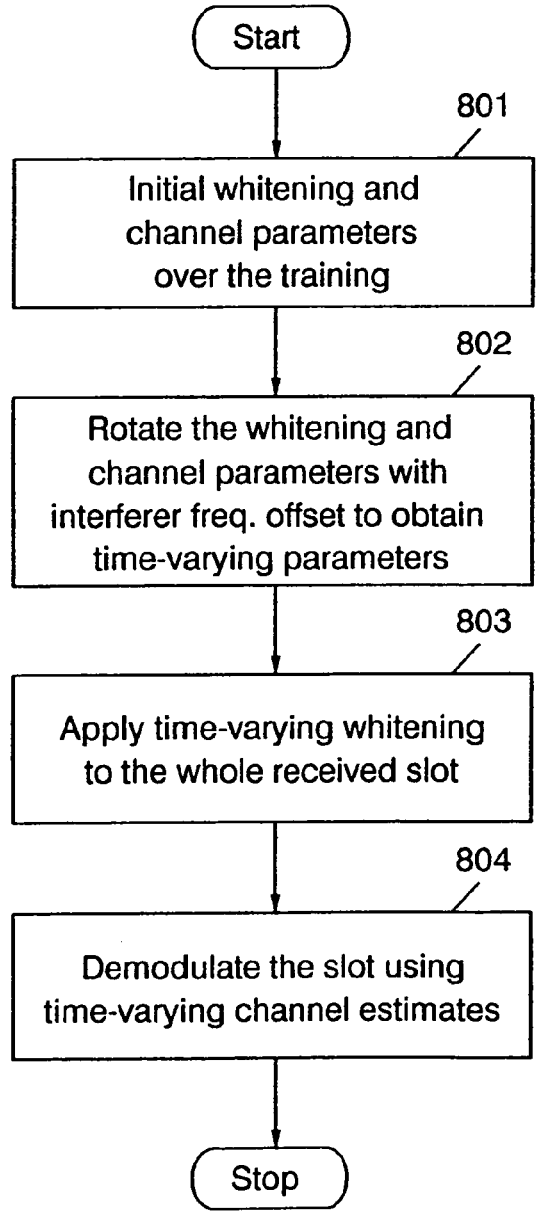
FIG. 8 is another flowchart illustrating the interference rejection method according to an embodiment of the invention.

FIG. 8 illustrates the process carried out by the apparatus of FIG. 7 in another flowchart. At step 801 the initial whitening and channel parameters are determined. At step 802 these parameters are rotated to obtain time-varying parameters. At step 803 they are applied via the filter to whiten the entire received timeslot. At step 804 the timeslot is demodulated using the time varying channel parameters.

Another way to account for frequency offset in the SAIR is to de-rotate the received signal based on the frequency offset. The received signal with a frequency offset in the interferer is given by:

$$\bar{r}(n) = \sum_{m=0}^{L} \bar{h}(m)s(n-m) + \bar{v}(n)e^{j2\pi f_0 n}.$$

The de-rotated signal can be written as:

$$\bar{r}'(n) = \bar{r}(n)e^{-2\pi f_0 n} = e^{-2\pi f_0 n}\sum_{m=0}^{L} \bar{h}(m)s(n-m) + \bar{v}(n),$$

which becomes, $$r'(n) = C(n)\sum_{m=0}^{L} h(m)s(n-m) + v(n).$$

Now, the interferer does not have a frequency offset, but the desired signal has a frequency offset. The channel taps for the desired signal can be rotated in time accordingly. The SAIR algorithm can be used without accounting for the frequency offset for the whitening filter parameters. Time-varying channel parameters will still have to be obtained as before. Applying the whitening filter in this case results in:

$$r'_w(n) = D\left[\sum_{k=0}^{K} W_k C^H(n-k)\sum_{m=0}^{L} h(m)s(n-m-k)\right] + De(n).$$

Figure 9:
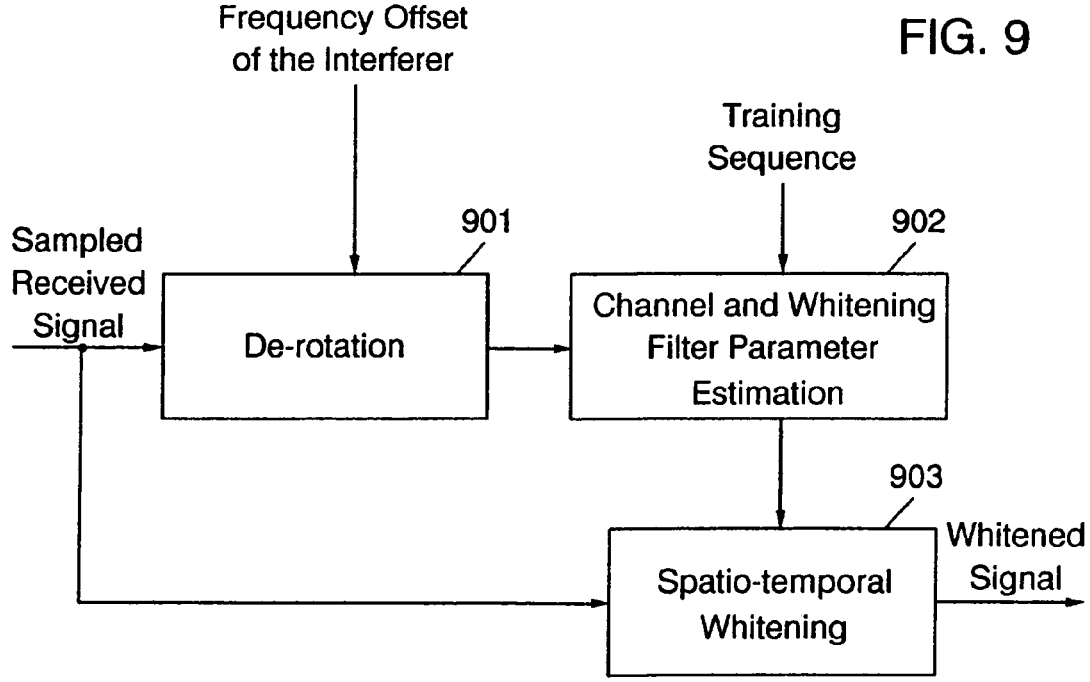
FIG. 9 is another block diagram of a single-antenna interference rejection (SAIR) block used in a receiving system according to an embodiment of the invention.

FIG. 9 illustrates an embodiment of the invention where the frequency offset is accounted for by de-rotating the received signal. De-rotation is accomplished at block 901 based on the frequency offset of the interferer, before application of the SAIR. Thus, the frequency offset of the interferer is eliminated. Therefore, the interferer is time-invariant, however, the desired signal is time-varying. Whitening filter parameters and channel parameters are estimated using the training sequence at block 902. Since the interferer does not change, constant whitening filter parameters that are obtained over the training are applied to the whole received slot by spatio-temporal whitening filter 903. However, the channel estimates of the desired signal are rotated according to the original frequency offset of the interferer. Therefore, according to this embodiment, the whitening filter parameters are constant over the whole slot, but the desired signal's channel parameters will be time-varying. Both the fixed whitening filter parameters and fixed channel parameters can be obtained over the training. The channel parameters are then rotated accordingly to obtain the correct time varying channel parameters.

Figure 10:
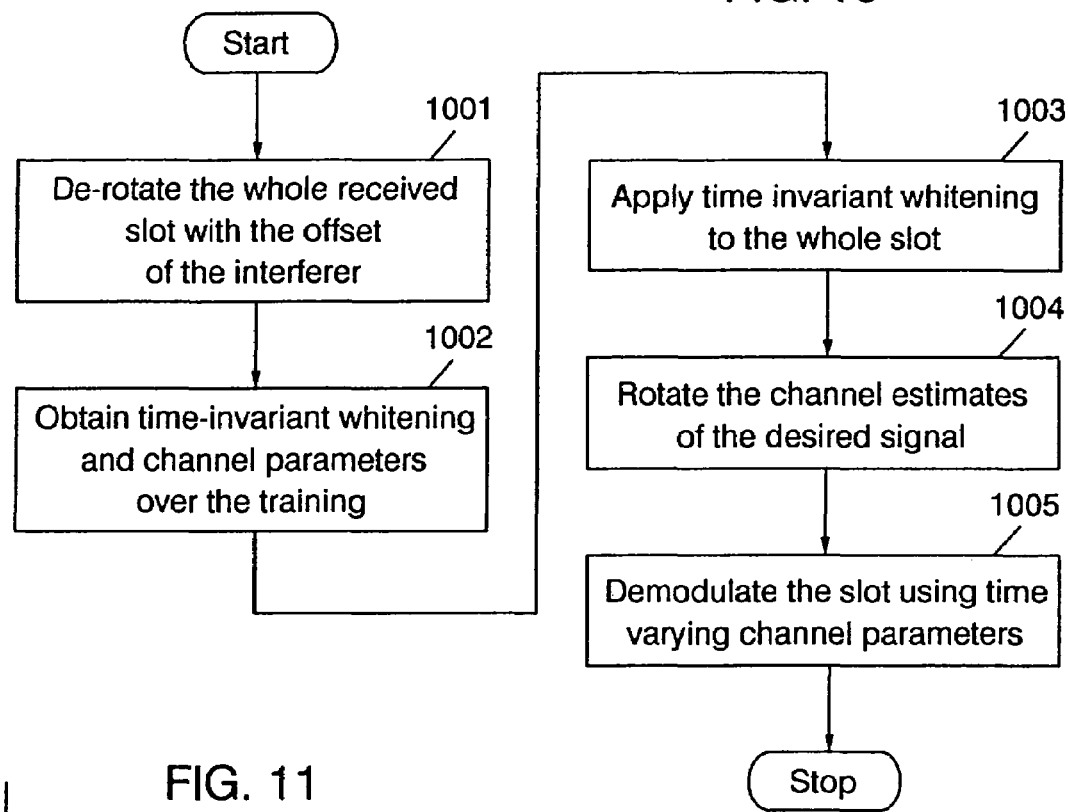
FIG. 10 is another flowchart illustrating the interference rejection method according to an embodiment of the invention.

FIG. 10 illustrates the process just discussed in flowchart form. At step 1001 the received signal is de-rotated. At step 1002, time-invariant whitening filter parameters are obtained. Channel parameters are also obtained over the training sequence. At step 1003, time-invariant whitening filter parameters are applied to the entire timeslot. At step 1004 the channel parameters are rotated. At step 1005 the estimated channel parameters are used to demodulate the timeslot.

Figure 11:
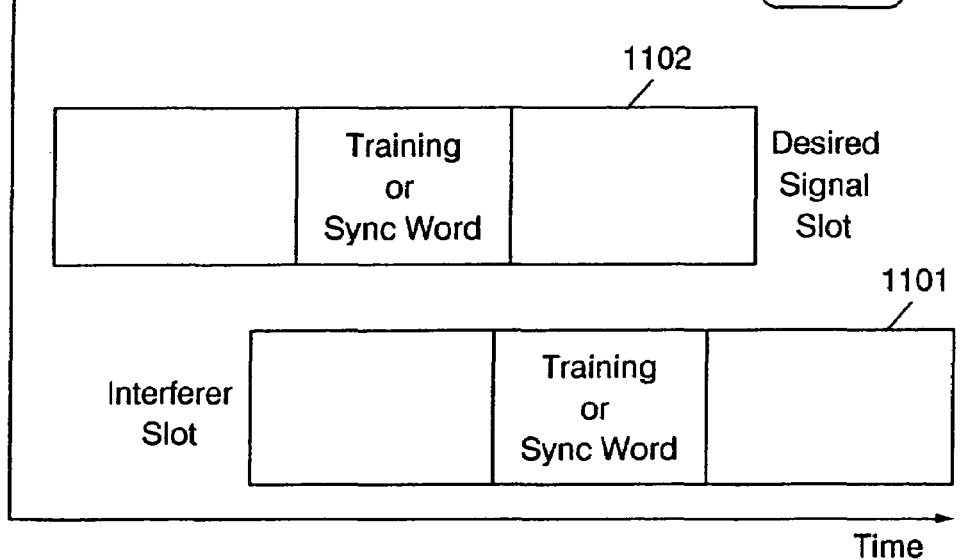
FIG. 11 illustrates slot misalignment as handled during interference canceling according to one embodiment of the invention.

Another alternative for providing the SAIR function in the presence of a frequency offset can be used if the frequency offset is unknown and not easy to estimate. In this embodiment, the whitening filter parameters are tracked over the data portion of the timeslot. Tracking can be done continuously or on a portion-by-portion basis. For the tracking, estimated data is initially used. The prefilter parameters are calculated over the synch word and applied to the received signal. With such tracking, slot-misaligned cases can also be handled. When the impairment characteristics change, parameters can be updated. FIG. 11 illustrates a slot-misaligned situation. As can be seen, interferer slot 1101 is delayed relative to desired signal slot 1102.

Figure 12:
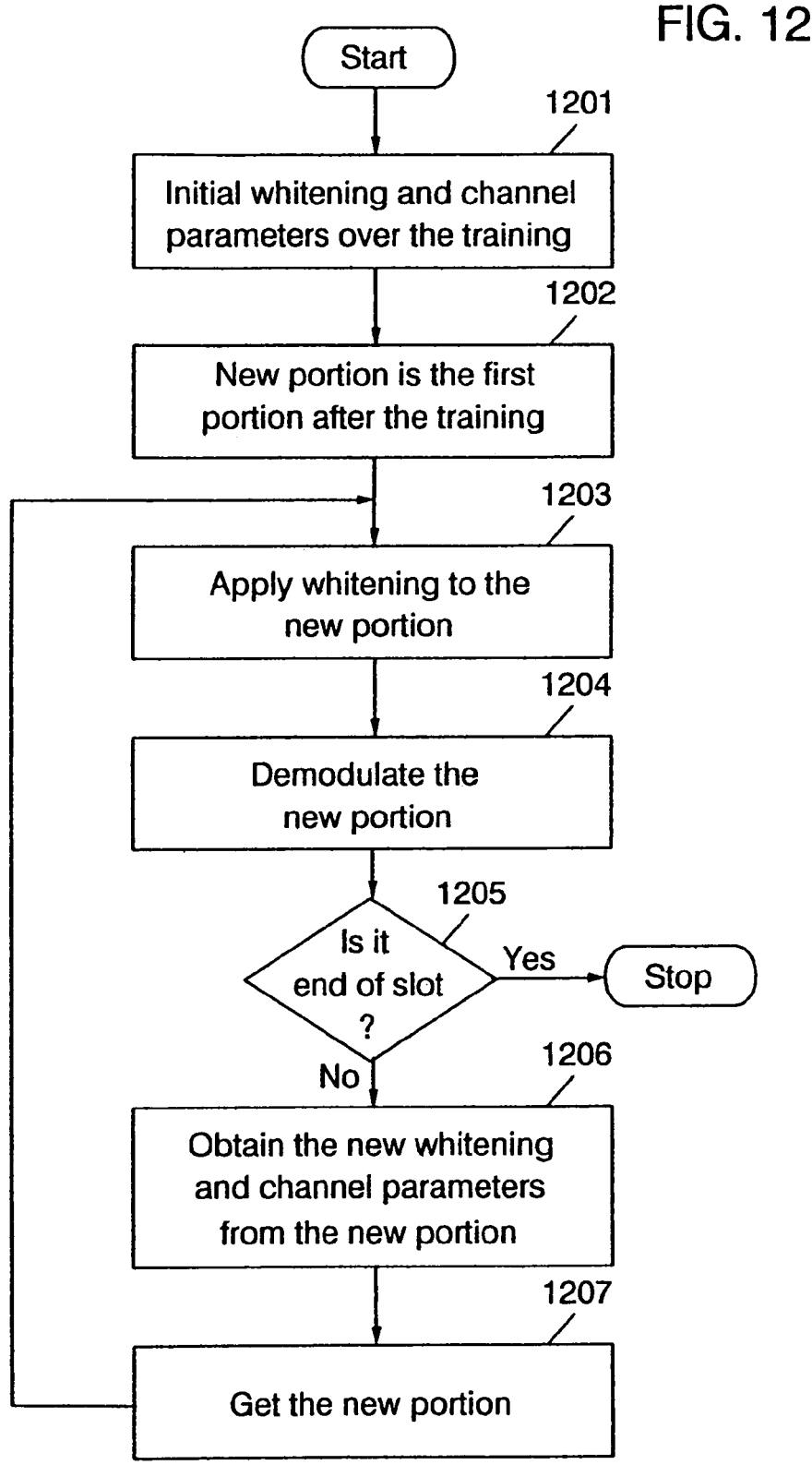
FIG. 12 is another flowchart illustrating the interference rejection method according to an embodiment of the invention.

FIG. 12 illustrates the method just described in flowchart form. To accomplish the tracking, a SAIR with fixed parameters is applied over the synch word to calculate the initial whitening filter parameters and channel parameters, as shown at step 1201. At 1202 the first portion of the timeslot is set to the "new portion". At 1203, the whitening filter using the initial parameters is applied. At 1204, the new portion is demodulated using the channel parameters. Prefiltering is also applied if needed. At 1205 a test is made to determine if the demodulation of the timeslot is complete. If so, the process stops. If not, whitening filter and channel parameters for the next portion, if there is one, are estimated from the current portion at 1206. The next "new portion" is retrieved at 1207.

Figure 13:
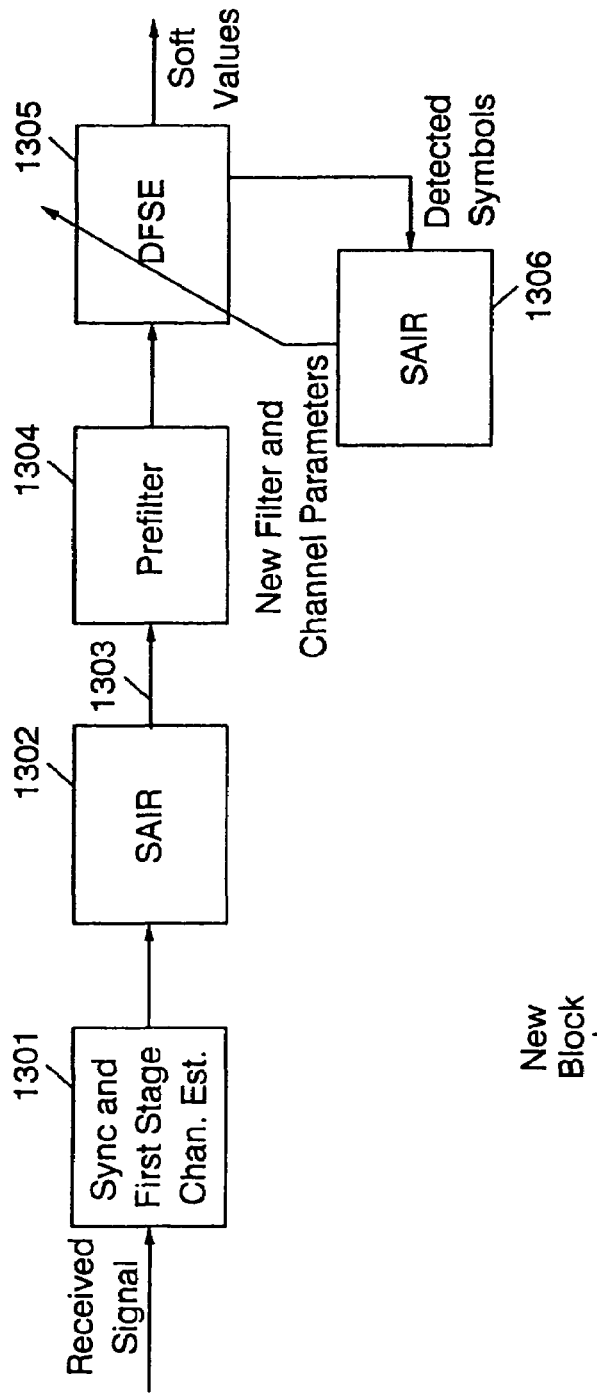
FIG. 13 is another block diagram of a receiving system according to an embodiment of the invention.

FIG. 13 shows a block diagram of the pertinent parts of a receiving system implementing the embodiment discussed with respect to FIG. 12. Synchronization and channel estimation logic 1301 are present as before. SAIR block 1302 obtains the whitening filter parameters and desired signal's channel parameters over the training sequence, which are output at 1303. The whitening parameters are applied to a portion of the slot just after the synch word, then this portion of the slot is demodulated through prefilter 1304 and DFSE block 1305 using the whitened samples and the channel parameters of the desired signal. The demodulated symbols over this portion of the slot are used to estimate new whitening filter and channel parameters. The new whitening parameters are applied to each new portion of the timeslot by SAIR block 1306 to obtain the whitened samples for this portion and the process continues likewise. SAIR block 1302 and SAIR block 1306, though logically separate, may be in fact implemented by the same SAIR logic.

Figure 14:
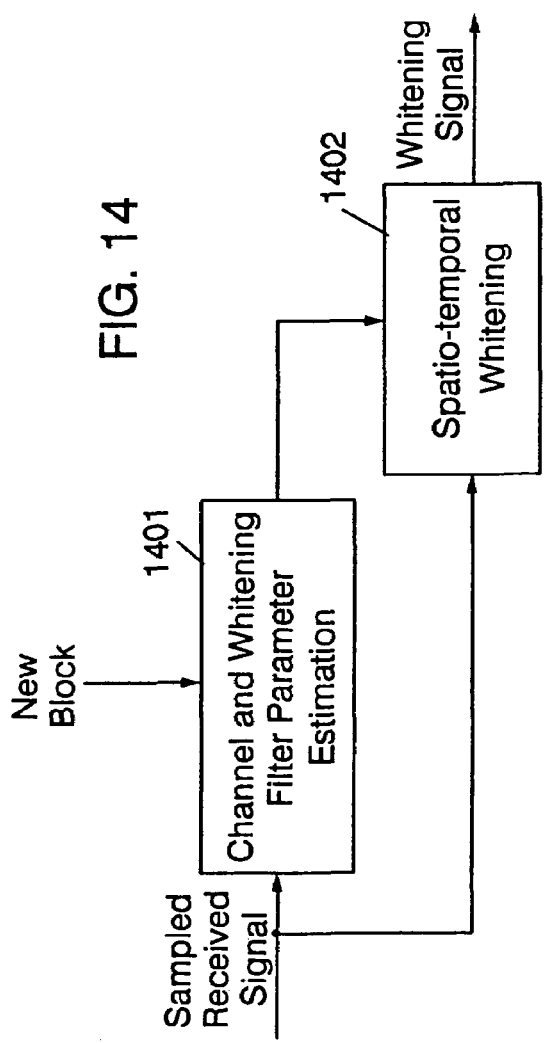
FIG. 14 is another block diagram of a single-antenna interference rejection (SAIR) block used in a receiving system according to an embodiment of the invention.

FIG. 14 shows a more detailed block diagram of SAIR block 1306 of FIG. 13. Since the signal is being supplied to the SAIR block and a portion-by-portion basis, there is no channel or signal rotation. This SAIR block is similar to a SAIR block that might be used in a system that does not take frequency offset into account, except that the whitening filter and channel estimation block 1401 operates on each new block, not just on the training sequence. Spatio-temporal whitening filter 1402 is applied using the estimated filter parameters to produce a whitened signal.

Other embodiments are now described in which STIW is applied to the timing estimation performed in the synchronization logic of a receiver. The application of spatio-temporal Interference whitening at this stage can increase channel-to-noise ratio by determining the best timing offset with which to receive the symbols being sent in a timeslot.

As is well-known, synchronization logic in TDMA receivers performs course synchronization first, followed by fine synchronization. It is assumed that course synchronization is first performed before the interference whitening synchronization block by a traditional method. The synchronization method that makes use of STIW that is described in detail here is for fine synchronization.

Figure 15:
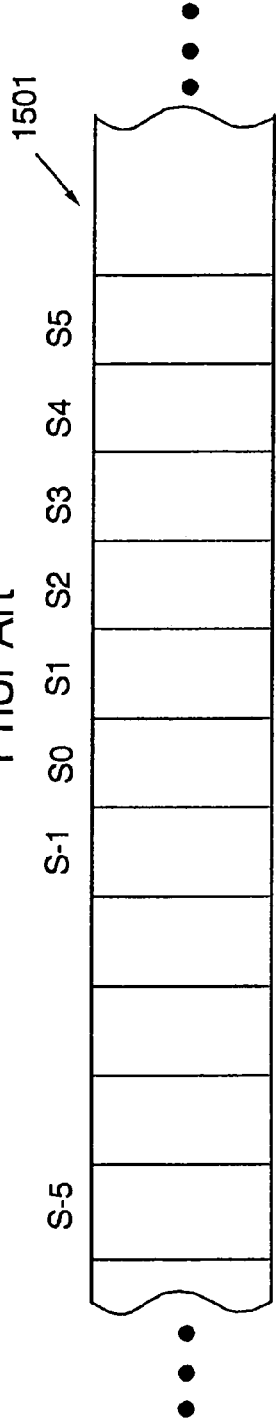
FIG. 15 illustrates the general concept of sampling a portion of a received signal to estimate timing for course synchronization.
Figure 15:
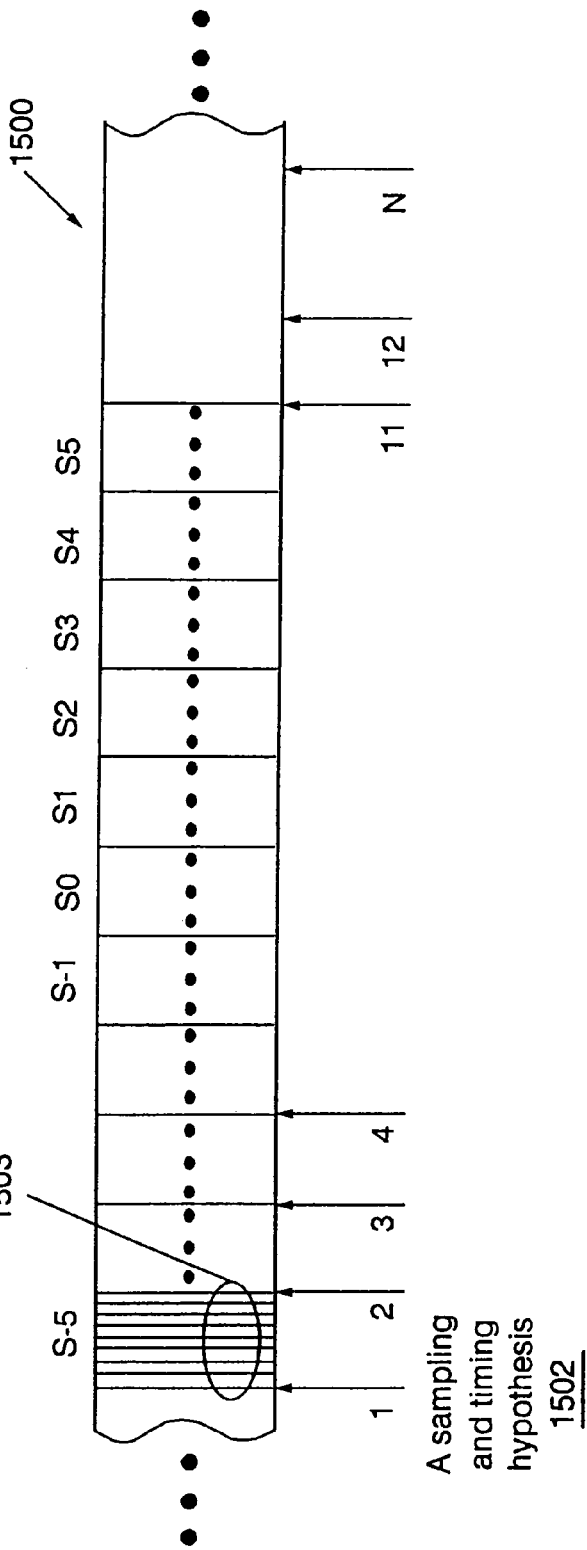

Fine synchronization according to the invention finds the best reference point (among all possible reference points determined in a coarse synchronization) for the downsampling and demodulation of the received samples. Finding the correct reference point is very important to the signal-to-noise-ratio (SNR) of the received signal, sometimes referred to as channel-to-noise (C/N) ratio in a TDMA system. FIG. 15 illustrates how course synchronization is accomplished what a timeslot looks like just before fine synchronization according to the invention. 1501 illustrates the timeslot before any synchronization, showing symbols S-5 through S5. 1500 shows the same timeslot after course synchronization. A course sampling and timing hypothesis, 1502, showing samples 1, 2, 3, . . . N, one sample per symbol, results from the course synchronization. 1503 shows different potential sampling points within a symbol. Fine synchronization will need to determine which of these sampling points is best.

Before describing these embodiments of the invention in detail, it is useful to discuss one known, conventional way of performing fine synchronization. (or timing estimation). Assume that the coarse synchronization reduced the possible number of symbols to +/− K symbols, and assume that for each symbol there are M sampling position (for example 8 samples per symbol). Therefore, the total number of sampling hypotheses is (2K+1)M. Further, assume that for each sampling position hypothesis, the received signal is downsampled to one sample per symbol, resulting in $r_k(n)$ received samples for the kth sampling position hypothesis. A least square channel estimation is performed using the knowledge of the synch word. Using the estimated channel parameters, $\hat{H}_k$ and the known synch sequence, S, a replica of the received samples is calculated as $\hat{r}_k(n)$. The difference between what is received and what is modeled is calculated by:

$$e_k = \frac{1}{N}\sum_{n=1}^{N} |r_k(n) - \hat{r}_k(n)|^2$$

where N is the length of the synch sequence. This timing offset estimate minimizes the error among all possible timing hypotheses.

According to the invention, both interference cancellation and timing offset estimation are done jointly within the synchronization logic. For the interference cancellation part of the process a spatio-temporal interference whitening (STIW) approach is employed. The STIW used in the synchronization can be SAIR as previously described, or other types of STIW, including STIW using multiple antennas.

Figure 16:
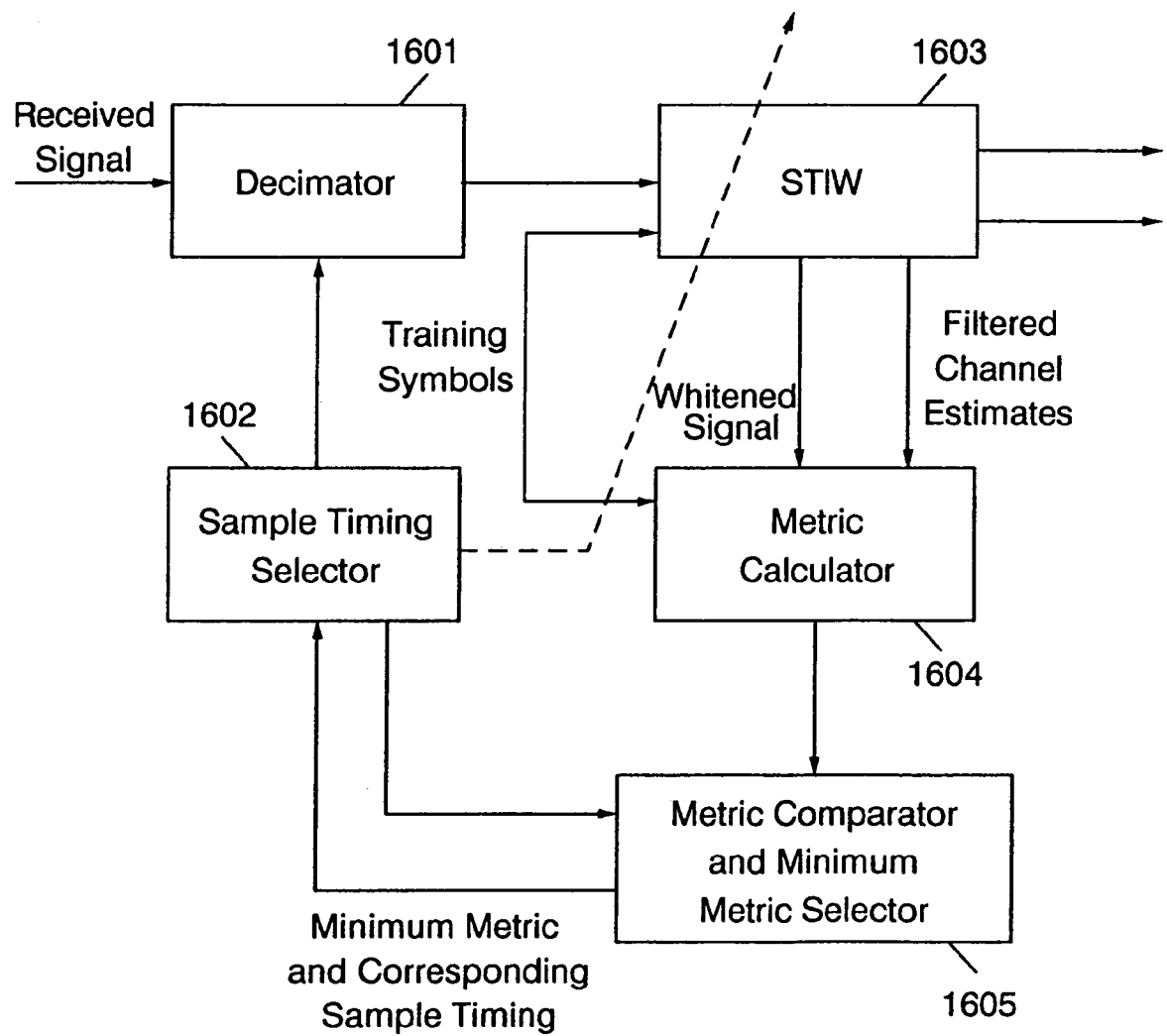
FIG. 16 is a block diagram showing a interference whitening synchronization block for a receiving system according to an embodiment of the invention.

A block diagram of an interference whitening synchronization block using STIW is shown in FIG. 16. The logic of FIG. 16 is normally located in block 500 of FIG. 5. This timing estimation can be independently applied to any receiver structure, or to any equalization scheme. FIG. 16 only shows one of these applications. Similarly, application of STIW in the timing offset estimation process does not necessarily require the use of STIW before equalization. It is possible to apply STIW only for the timing offset estimation, and perform equalization without whitening the received samples. A typical receiver includes the blocks that preprocess the received antenna signal (signal preprocessor). Typically, the preprocessor includes receiver filtering, amplifiers, and mixers that produce baseband signal. The received signal shown in all of the figures herein is the preprocessed signal.

FIG. 16 shows a block diagram of the joint timing offset estimation and interference whitening that is sometimes referred to herein as interference whitening synchronization. The received samples are decimated by decimator 1601 based on sample timing from the sample timing selector, 1602, to obtain the down-sampled received samples (usually one sample per symbol). The down-sampled received samples (around the training region) are passed through STIW block 1603. The output of the STIW block is the whitened received samples $z_k(n)$. In this embodiment, channel estimates $\hat{C}_k$ are passed trough the same whitening filters. The filtered channel estimates and the known training sequence s(n) are used to calculate a replica of the whitened received samples $\hat{z}_k(n)$. This calculation is performed in metric calculator block 1604. The difference between what is received and what is modeled is calculated as:

$$e_k = \frac{1}{N}\sum_{n=1}^{N} |z_k(n) - \hat{z}_k(n)|^2.$$

The calculated metric value from above is passed to the metric comparator and minimum metric selector block, 1605. This block compares all the calculated metric values corresponding to all the sample timing positions and finds the minimum metric value. The minimum metric value and the corresponding sample timing position is selected as the estimated sample timing position. The sample timing selector knows all the possible timing hypotheses, and one-by-one, provides the timing positions to the decimator. The sample timing selector knows whether there is another sample timing position to evaluate. Since the sample timing selector, 1602, is connected to the minimum metric selector, when all the hypotheses are evaluated, the sample timing selector provides the timing hypotheses that has the minimum metric to the decimator, 1601. The sample time selector 1602 may also be connected to the STIW block, 1603 to indicate that this is the best timing position and stop the process. This connection is represented by the dotted arrow in FIG. 16.

Decimator 1601 decimates the oversampled signal. Starting from the decided timing position, it selects one (or more) samples from each symbol. The decimator does not need to decimate the entire timeslot to test all the hypotheses. Only training samples are used. At the end of the process, when the best timing offset has been selected, the decimator may decimate the whole timeslot. The STIW algorithm in block 1603 may then operates on the decimated samples, calculating the vector valued whitening filter parameters and whitening all the received samples.

Figure 17:
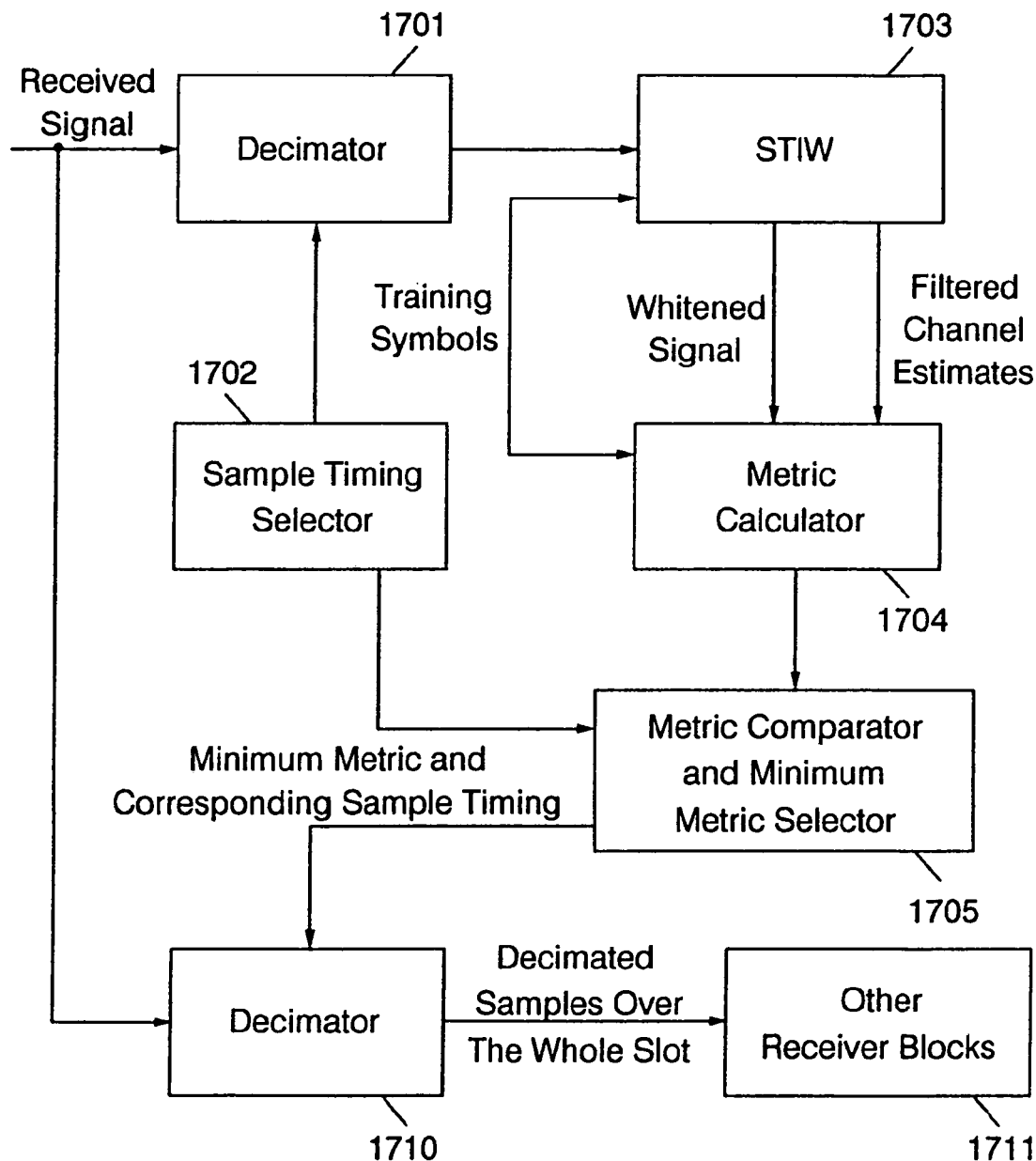
FIG. 17 is another block diagram showing another interference whitening synchronization block for a receiving system according to an embodiment of the invention.

FIG. 17 is a block diagram for the case where the receiver performs spatio-temporal whitening only for the timing offset estimation, and does not apply whiting to the whole received signal. Returning to FIGS. 4 and 5, FIG. 17 would represent the case where block 500 of FIG. 5 does not actually combine the functions of blocks 401 and 402 of FIG. 4. In this case, blocks 1701, 1702, 1703, 1704 and 1705 are similar to blocks 1601, 1602, 1603, 1604 and 1605 of FIG. 16. However, the STIW block and decimator 1701 never operate on the entire timeslot. Instead, final timing estimation can be used to decimate the signal at decimator 1710, and the decimated signal can be provided to other parts of the receiver, 1711. The other parts of the receiver may include a SAIR block as shown at 402 of FIG. 4, and discussed in previous sections of this application, especially if STIW 1703 is not a SAIR implementation.

Figure 18:
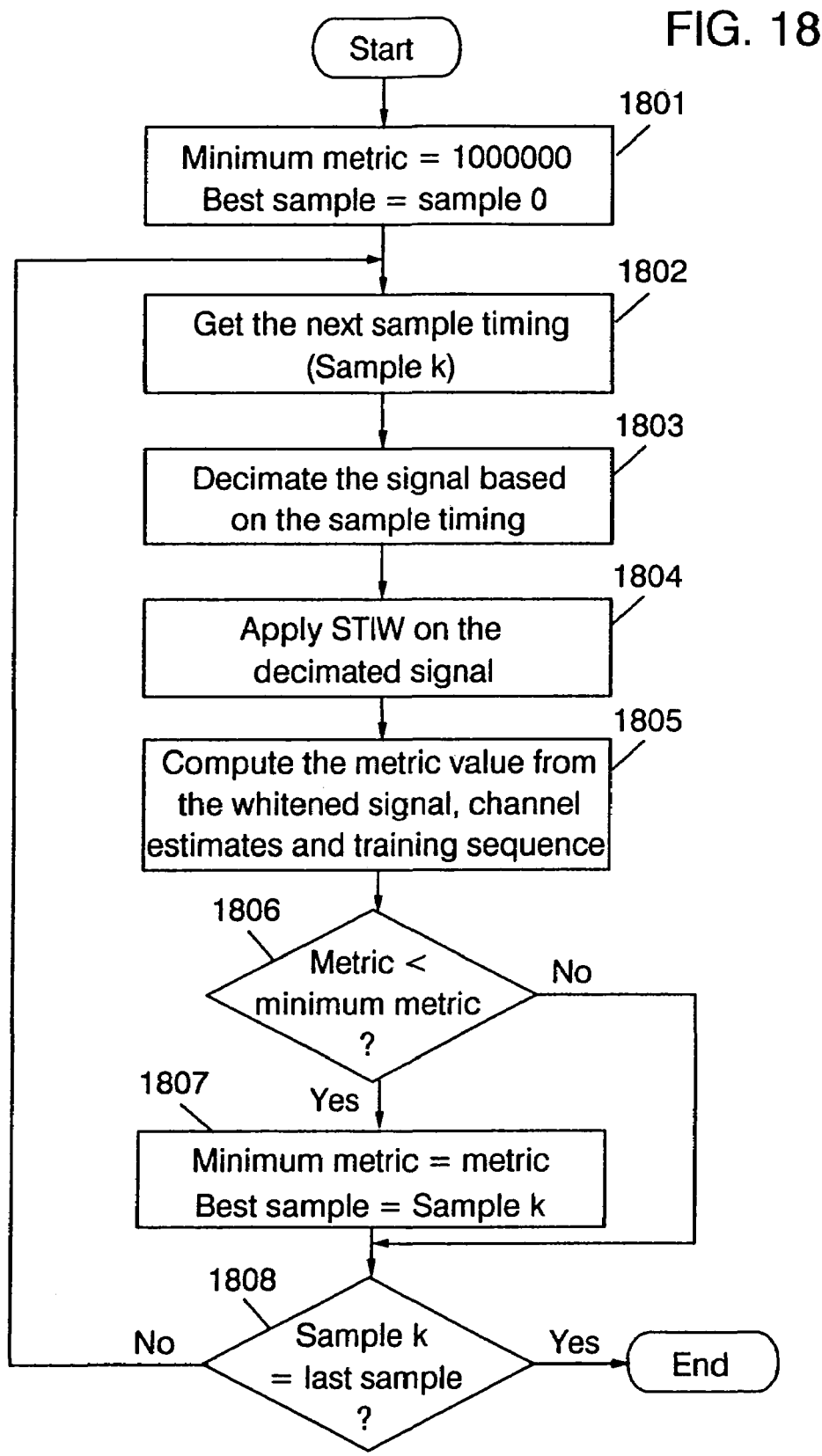
FIG. 18 is a flowchart illustrating the process of timing estimation according to an embodiment of the invention.

FIG. 18 illustrates the method described above in flowchart form. At step 1801, the minimum metric is set to some maximum acceptable value. For purposes of this example, the minimum metric has been set to 1,000,000. The best sample is also designated as the "$0^{th}$" sample. At step 1802, the next sample (sample k) is retrieved. At 1803, the signal is decimated based on the timing of sample k. At step 1804, the STIW algorithm is applied to the decimated signal. At step 1805, the metric value is computed for the whitened signal as decimated based on the timing of sample k for the training sequence, also taking into account the channel estimates over the training sequence. At 1806, the current metric is compared to the minimum metric. If the current metric is not less than the minimum metric, processing branches to decision point 1808, where a determination is made as to whether sample k is the last sample. If not, the process repeats, starting with step 1802. If so, the process ends. If the current metric is less than the minimum metric at decision point 1806, the minimum metric is set to the current metric and the best sample is set to the current sample, k, at step 1807.

Figure 19:
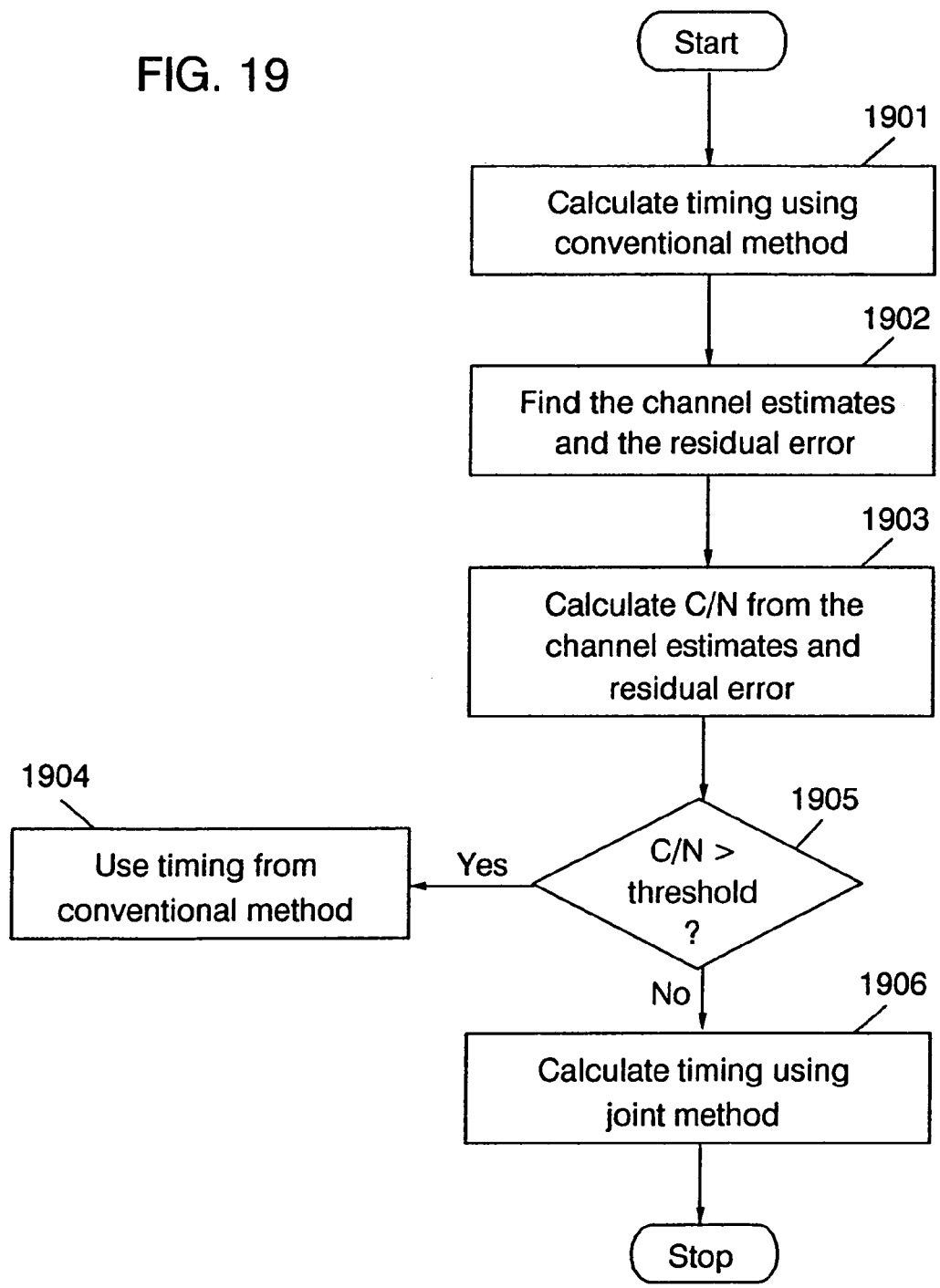
FIG. 19 is another flowchart illustrating the process of timing estimation according to another embodiment of the invention.

The peak and average computational complexities for the joint whitening and timing estimation are higher than for a conventional timing estimation approach. The average complexity can be reduced by employing the joint approach of the invention only if the carrier-to-noise-ratio (C/N) of the current slot is below some threshold value. If the C/N value is above the threshold, a less computationally intensive approach for timing estimation may perform well. In other embodiments of the invention, conventional timing estimation without STIW is combined with the interference whitening synchronization using joint timing estimation and STIW. FIG. 19 is a flowchart that illustrates one way to combine the algorithms. A conventional timing estimation is applied first to the received timeslot at step 1901. The channel estimates and the residual error (minimum metric value) are calculated using the estimated timing offset at step 1902. The C/N value is calculated from the channel estimates and the residual error value estimate at step 1903. The energy of the combined channel taps provides C, and the residual error provides N. If the estimated C/N value is below a threshold value at decision point 1905, then the joint timing estimation and STIW algorithm is employed at step 1906. Otherwise we use the timing estimates of the conventional algorithm as shown at 1904.

Figure 20:
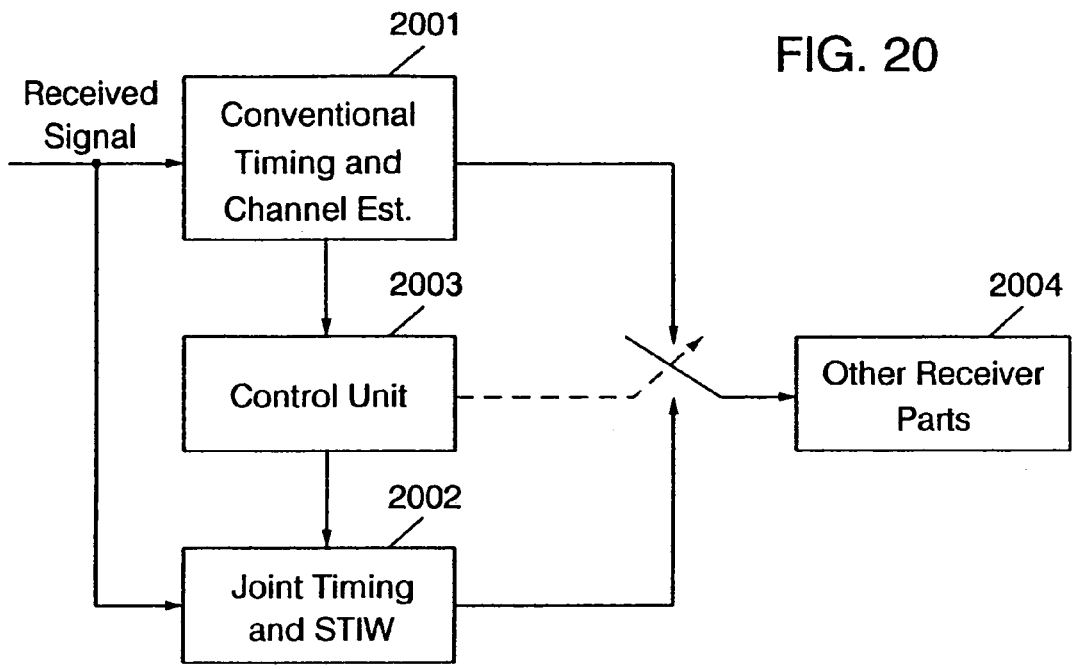
FIG. 20 is a block diagram of a receiving system illustrating certain aspects of a timing estimation method according to an embodiment of the invention.

FIG. 20 shows a block diagram of the combined algorithm as described above. A conventional timing estimation is applied first for the received timeslot by block 2001. Then, the channel estimates and the residual error are calculated from the estimated timing offset. If the C/N value is below a threshold value, then timing estimation is switched to the joint timing estimation and STIW algorithm implemented in block 2002. Decisions are made by the control unit, 2003. The "other receiver parts," 2004 are as previously described.

Figure 21:
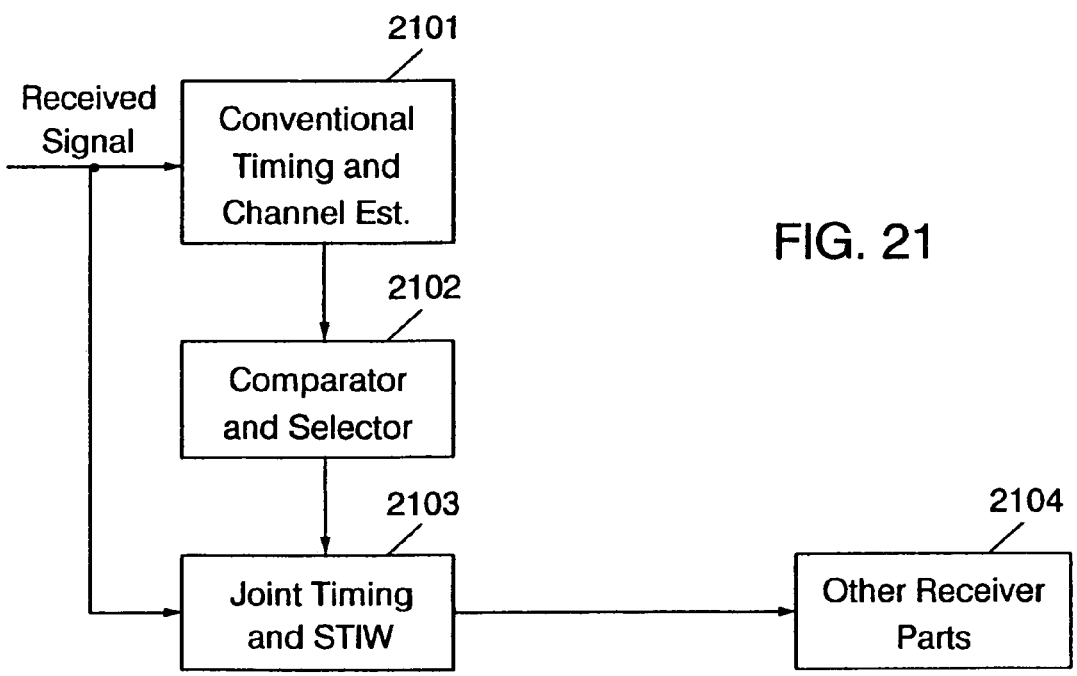
FIG. 21 is a block diagram of a receiving system illustrating certain aspects of a timing estimation method according to another embodiment of the invention.

Another way of combining the conventional timing estimation with the interference whitening synchronization block implementing joint timing estimation and STIW is to employ the conventional timing estimation to narrow-down the possible timing position choices. Then, joint algorithm can be used to obtain a finer timing estimate. FIG. 21 is a block diagram that also illustrates the signal flow for this embodiment. Assume that initially there are X possible timing offset positions. The conventional algorithm is executed by block 2101 first. From the conventional algorithm, the metric values (residual errors) corresponding to all the timing positions are calculated. These metric values and the initial timing positions are passed through comparator and selector block, 2102, where a group (Y out of X, where Y<X) of the smallest metric values and the corresponding timing positions are selected. These selected timing positions are fed to the interference whitening synchronization block, 2103, where the joint timing estimation and STIW algorithm are executed for better tuning. Other receiver parts 2104 are as previously discussed.

Other embodiments could also be devised where timing offset estimation is done only for some subset of the possible timing hypotheses. For example, for each symbol, a random timing offset can be selected rather than formally hypothesizing timing sample values for each symbol. In this case, the timing offset hypothesis only consists of the different symbol timings, not the samples within the symbols.

As previously discussed, the joint synchronization and STIW approach can be used with either single or multiple antenna receivers. There are various possible extensions of the to the multiple antenna receivers. In multiple antenna receivers, for each antenna element, instead of employing a conventional timing estimation, the proposed interference whitening synchronization algorithm can be employed to get the timing of that antenna element. An independent STIW algorithm (in the I-Q domain) in each antenna element can be combined with spatial whitening across antenna elements. The independent STIW algorithm (in the I-Q domain) in each antenna element can be combined with another STIW algorithm across the antenna elements. Such an algorithm can be performed iteratively by first treating each antenna element independently, then applying STIW in the I-Q domain to get the possible timing estimates. The number of hypotheses can optionally be reduced. STIW is then applied across antennas.

Figure 22:
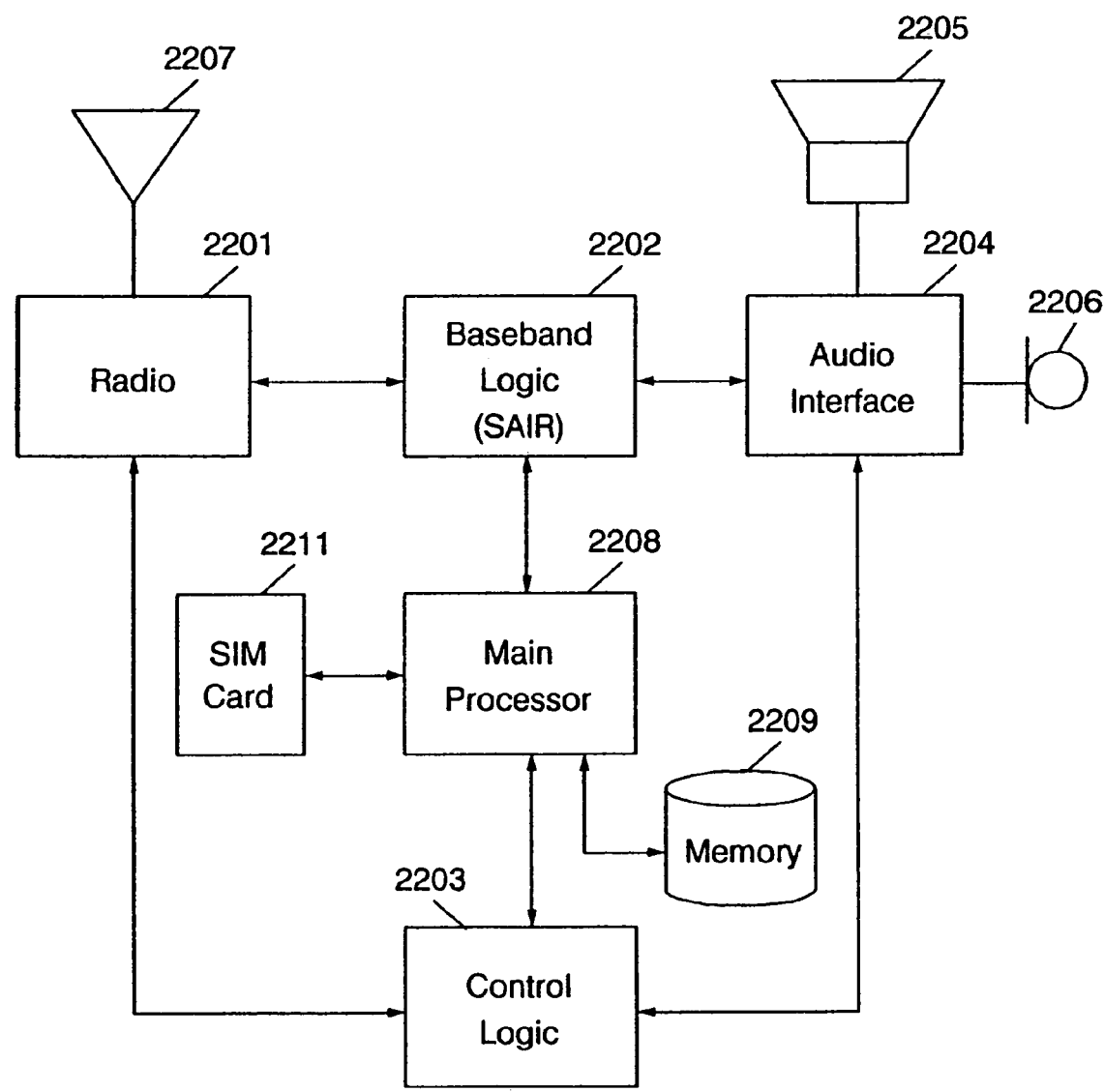
FIG. 22 is a block diagram of a wireless terminal which can embody the invention.

FIG. 22 is a block diagram of a mobile terminal that implements the invention. FIG. 22 illustrates a terminal with voice capability, such as a mobile telephone. This illustration is an example only, and the invention works equally well with mobile terminals that are dedicated to communicating with text or other forms of data. As described above, some embodiments of the invention can also work in base stations designed to communicate with such a mobile terminal. As shown in FIG. 22, the terminal includes radio block 2201, a baseband logic block, 2202, control logic block 2203 and an audio interface block, 2204. Within radio block 2201, the receive and transmit information is converted from and to the radio frequencies (RF) of the various carrier types, and filtering is applied, as is understood in the art. Radio block 2201 includes the preprocessor previously discussed. The terminal's antenna system, 2207, is connected to the radio block. In baseband logic block 2202, basic signal processing occurs, e.g., synchronization, channel coding, decoding and burst formatting. In this example, the baseband logic includes the SAIR of the invention. The baseband logic block also optionally includes the interference whitening synchronization block according to the invention. Audio interface block 2204 handles voice as well as analog-to-digital (A/D) and D/A processing. It also receives input through microphone 2205, and produces output through speaker 2206. Control logic block 2203, coordinates the aforedescribed blocks and also plays an important role in controlling the human interface components (not shown) such as a key pad and liquid crystal display (LCD). The functions of the aforedescribed transceiving blocks are directed and controlled by one or more microprocessors or digital signal processors such as main processor 2208, shown for illustrative purposes. Program code, often in the form of microcode is stored in memory 2209 and controls the operation of the terminal through the processor or processors. The mobile terminal illustrated in FIG. 22 interfaces to a smart card identity module (SIM), 2211, through a smart card reader interface. The interconnection between the main processor, control logic, memory, and SIM is depicted schematically. The interface is often an internal bus.

A mobile terminal implementation of the invention does not have to be a traditional "cellular telephone" type of terminal, but may include a cellular radiotelephone with or without a multi-line display; a personal communications system (PCS) terminal that may combine a cellular radiotelephone with data processing, facsimile and data communications capabilities; a personal data assistant (PDA) that can include a radiotelephone, pager, Internet/intranet access, Web browser, organizer; and a conventional laptop and/or palmtop computer or other appliance that includes a radiotelephone transceiver. Mobile terminals are sometimes also referred to as "pervasive computing" devices.

Some embodiments of the invention can be implemented in base station systems as previously described. An exemplary BSS includes a base station controller (BSC) and base station transceivers or base transceiver stations (BTS), each providing service for a single cell through an antenna system. The antenna system can have a single antenna, or multiple antennas. Each BTS includes at least one transmitter as well as one or more receiving systems that receive timeslots on uplink frequencies. One or more of these receiving systems embody the invention.

Specific embodiments of an invention are described herein. One of ordinary skill in the networking and signal processing arts will quickly recognize that the invention has other applications in other environments. In fact, many embodiments and implementations are possible. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

We claim:

1. A method of canceling interference over a timeslot of a received signal in a time domain multiplexed access communication system, the method comprising:
    using single antenna interference rejection (SAIR) to determine spatio-temporal, time-varying whitening filter parameters and time-varying channel parameters for the timeslot based on a frequency offset between an interferer and a desired signal;
    applying the SAIR using the time varying whitening filter parameters to the received signal over the timeslot to obtain a whitened signal;
    prefiltering the whitened signal; and
    applying decision feedback sequence estimation (DFSE) to demodulate the whitened signal over the timeslot using the time-varying channel parameters.

2. The method of claim 1 wherein determining time-varying spatio-temporal whitening filter parameters further comprises:
    determining initial whitening filter parameters and initial channel parameters using a training sequence for the timeslot; and
    rotating the initial whitening filter parameters and the initial channel parameters with the frequency offset to obtain the time varying whitening filter parameters and the time varying channel parameters.

3. The method of claim 2 wherein demodulating the whitened signal further comprises applying maximum likelihood sequence estimation to the whitened signal.

4. The method of claim 1 wherein demodulating the whitened signal further comprises applying maximum likelihood sequence estimation to the whitened signal.

5. A processor-controlled receiving system enabled to cancel interference in a received signal, the receiving system comprising:
    synchronization and channel estimation logic;
    a single antenna interference rejection (SAIR) block connected to the synchronization and channel estimation logic, the SAIR block for determining time-varying channel parameters and applying a time-varying whitening filter to the received signal based on a frequency offset between the desired signal and an interferer to obtain a whitened signal;
    a prefilter connected to the SAIR block; and
    a decision feedback sequence estimation (DFSE) block connected to the prefilter so that the whitened signal is demodulated using the time varying channel parameters.

6. The receiving system of claim 5 wherein the SAIR block further comprises:
    logic for determining initial whitening filter parameters and initial channel parameters for a timeslot in the received signal; and
    a rotation block for rotating the initial whitening filter parameters and the initial channel parameters with they frequency offset to obtain time-varying whitening filter parameters and the time-varying channel parameters for the timeslot in the received signal.

7. Apparatus for canceling interference over a timeslot of a received signal in a time domain multiplexed access communication system, the apparatus comprising:
    means for using a single antenna interference rejection (SAIR) to determine spatio-temporal, time-varying whitening filter parameters and time-varying channel parameters for the timeslot based on a frequency offset between an interferer and a desired signal;
    means for applying the SAIR using the time varying whitening filter parameters to the received signal over the timeslot to obtain a whitened signal;
    means for prefiltering the whitened signal; and
    means for applying decision feedback sequence estimation (DFSE) to demodulate the whitened signal over the timeslot using the time-varying channel parameters.

8. The apparatus of claim 7 further comprising:
    means for determining initial whitening filter parameters and initial channel parameters using a training sequence for the timeslot; and
    means for rotating the initial whitening filter parameters and the initial channel parameters with the frequency offset to obtain the time varying whitening filter parameters and the time varying channel parameters.

9. The apparatus of claim 8 further comprising means for applying maximum likelihood sequence estimation to the whitened signal.

10. The apparatus of claim 7 further comprising means for applying maximum likelihood sequence estimation to the whitened signal.

* * * * *